Aug. 11, 1925.

F. M. BARRELL 1,548,927

CLOTHESLINE ADJUSTER

Filed Oct. 1, 1924

INVENTOR
Ferdinand M. Barrell
BY
Warren S Orton.
ATTORNEY

Patented Aug. 11, 1925.

1,548,927

UNITED STATES PATENT OFFICE.

FERDINAND MASSA BARRELL, OF WHITE PLAINS, NEW YORK.

CLOTHESLINE ADJUSTER.

Application filed October 1, 1924. Serial No. 740,926.

*To all whom it may concern:*

Be it known that I, FERDINAND MASSA BARRELL, a citizen of the United States, and resident of White Plains, in the county of Westchester and State of New York, have invented certain new and useful Improvements in Clothesline Adjusters, of which the following is a specification.

The invention relates to a line adjuster or fastening means designed for use in rigging or taking up the slack in ropes and other flexible connections such as clothes lines and the like.

In endless clothes lines of the pulley type it is required that the length of the rope be adjusted from time to time in order to take up slack or to release excessive tension on the line. Numerous forms of take-up devices have been suggested for use in such cases, but such devices have not proven satisfactory, due either to the high cost of constructing the same, or due to the fact that the average housewife or laundress is not sufficiently skilled to make the necessary adjustments. Further, such devices have been usually made of stampings or castings with sharp edges which eventually cut through the rope.

The primary object of the present invention is to provide a simplified and easily constructed, and therefore inexpensive form of fastener by means of which the inexperienced operator can quickly make the necessary adjustments to let out or take up slack in the clothes or other associated rope or line.

Broadly I attain this object by forming the fastener of a length of bent wire, so shaped that a free end of the rope can be easily weaved through portions of the fastener which are shaped to form a cleat.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1:
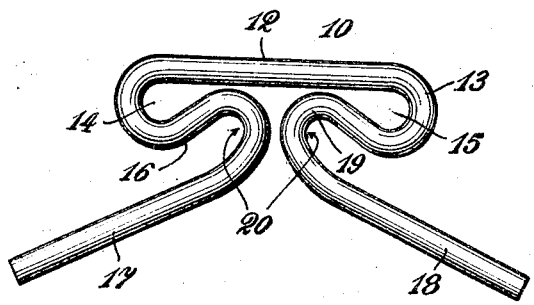
Figure 2:
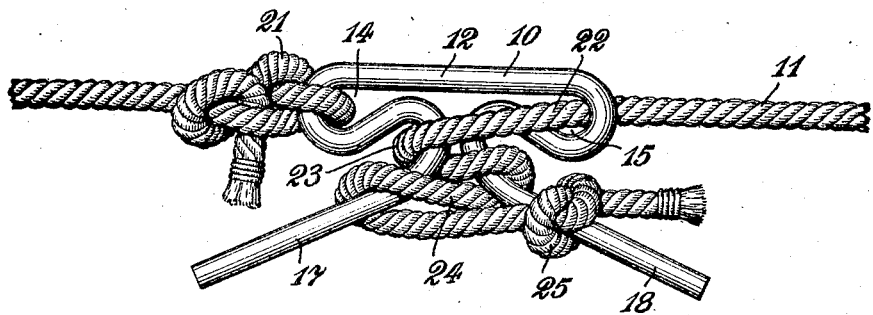

Figure 1 is a view in side elevation of a fastener constituting a preferred embodiment of the invention; and Figure 2 is a similar view of the same shown in operating position forming the connection between the ends of a clothes line of the pulley type.

In the following description and in the claims, parts will be identified by specific names for convenience of expression but they are intended to be as generic in their application to similar parts as the art will permit.

In the drawing there is shown a fastener 10 formed of a single length of wire and preferably round wire of a gage sufficiently large to prevent cutting of the rope 11 used with the same. The fastener comprises a straight central portion 12 opposite ends 13 of which are bent back upon themselves to form a pair of spaced apart eyes 14 and 15. The eye forming portions 16 of the wires which underlap the straight central portion 12 are extended towards the center of the portion 12 and coact therewith to form a T-head. Each of the ends constituting the continuation of the portions 16 are again bent back sharply upon themselves and extend outwardly to form a pair of shoulder forming ends 17 and 18. The sharp S-shaped bends 19 between the portions 16 and the shoulder forming ends are disposed in juxtaposition, almost touching, as shown in Figure 1, and coact to form a recessed neck 20.

The top 11 has one end 21 looped through the eye 14 and secured as by knotting the same. The rope has its other end 22 threaded through the eye 15, is looped partially about the neck 20, as shown at 23, and is then weaved with S-loops 24 back and forth inter-twined about the shoulder forming ends 17 and 18.

If desired the platted end of the rope may be tied with a loose knot 25 engaging the end 18 as shown or engaging the part of the rope, marked 11 in the drawing, but this is not essential as the rope will hold securely in position due to its looping engagement in the cleat formed by the ends 17 and 18.

Should it be desired to adjust the length of the pulley rope, it is necessary simply to untie the knot 25, if such knot be used, to unweave the loops 24 from their engagement with the shoulder forming end, draw in or play out the end 22 through the eye 15 and, when properly adjusted, reweave the adjusted end of the rope about the shoulder forming ends 17 and 18 which constitute the floating cleat.

As the device is formed of stock wire and can be constructed on a conventional form of wire bending machine, the manufacturing cost has been minimized, and the device can therefore sell at a lower price than is possible with similar articles which must be cast, machined or otherwise formed.

The rounded surface of the wire eliminates any tendency to cut the rope and the resiliency inherent in the wire provides a sufficient elasticity to compensate for any unusual or accidental pull on the rope. As the line of strain caused by the pull in opposite direction of the rope end is parallel to the length of the head, there is little, if any tendency for the fastener to become distorted. The wrapping of the rope about the neck portion acts to secure the neck forming bends 20 in place and this tends further to prevent any openings of the cleat forming parts or any other distorting of the device. The rounded inner peripheries of the eyes permits of any easy slipping of the rope through the eyes and this has been found to be quite efficacious under some circumstances, as where ice is formed on the fastener.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device of the class described, the combination of a rope fastener formed of a single length of wire having a central portion with opposite ends bent back upon itself to form a head with a pair of eyes at opposite ends and each end again curved outwardly back on the eye forming portion to form a pair of outwardly diverging shoulder forming ends, the portions of the shoulder forming ends at their juncture with the head being in juxtaposition and coacting to form a neck, and a rope having one end secured to one of the eyes, and having the other end threaded through the other eye, looped partially about the neck and braided in S form about the two shoulder forming ends.

2. In a device of the class described, the combination of a fastener for taking up slack in a rope, said fastener formed of a single length of wire with a central portion bent back upon itself at opposite ends to form a head with a pair of eyes, and with the ends in juxtaposition and coacting with the parts forming the eyes to form a recessed neck, and a rope with one end secured to one of the eyes and with the other end threaded through the other eye and looped about the recessed neck.

3. A fastener for taking up slack in a rope comprising a single length of wire having a central portion with opposite ends bent back upon themselves towards the central portion to form a pair of eyes and the ends being bent away from the central portion of the head to form a recessed neck at the central portion and a pair of shoulder forming ends diverging from each other outwardly from the neck.

4. A fastener comprising a single length of round wire formed with a central portion having its ends bent back to form a pair of eyes, outlined by rounded surfaces and the ends of the wires diverging from each other and from the center of the head and coacting to form a recessed neck and a pair of shoulder forming ends extending outwardly from the neck.

Signed at White Plains, in the county of Westchester and State of New York, this 16th day of September, A. D. 1924.

FERDINAND MASSA BARRELL.

Witnesses:
RAYMOND C. SPAULDING,
JEANNETTE HUTCHINSON.